Jan. 21, 1958      G. W. HELLER      2,820,752
ELECTRODEPOSITION OF TETRAFLUOROETHYLENE POLYMERS
Filed Feb. 4, 1954      2 Sheets-Sheet 1
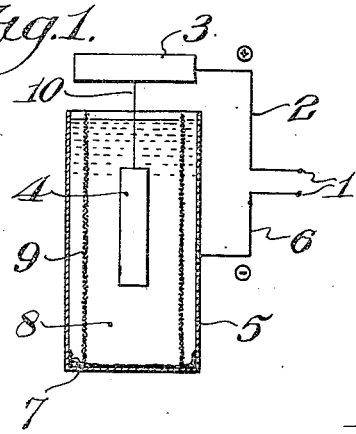
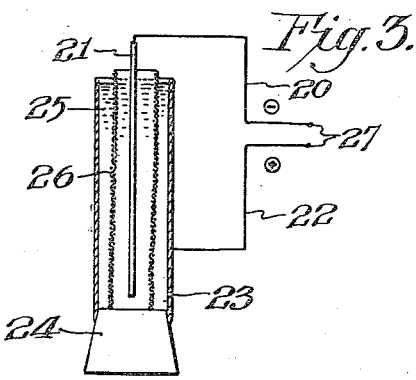
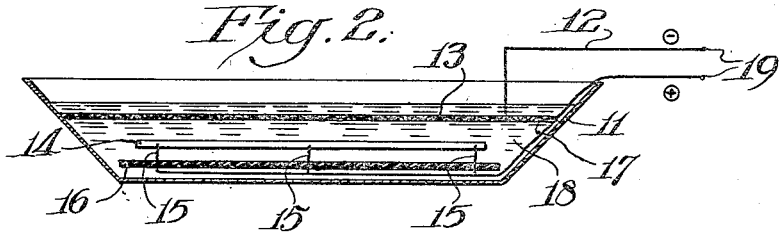
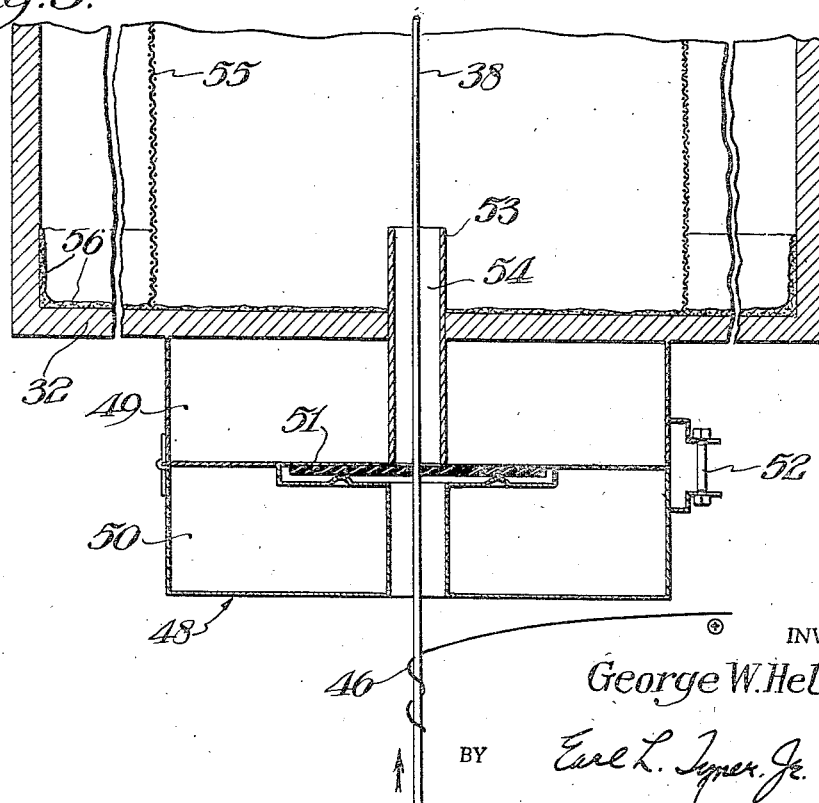
INVENTOR
George W. Heller
BY Earl L. Tyner, Jr.
ATTORNEY

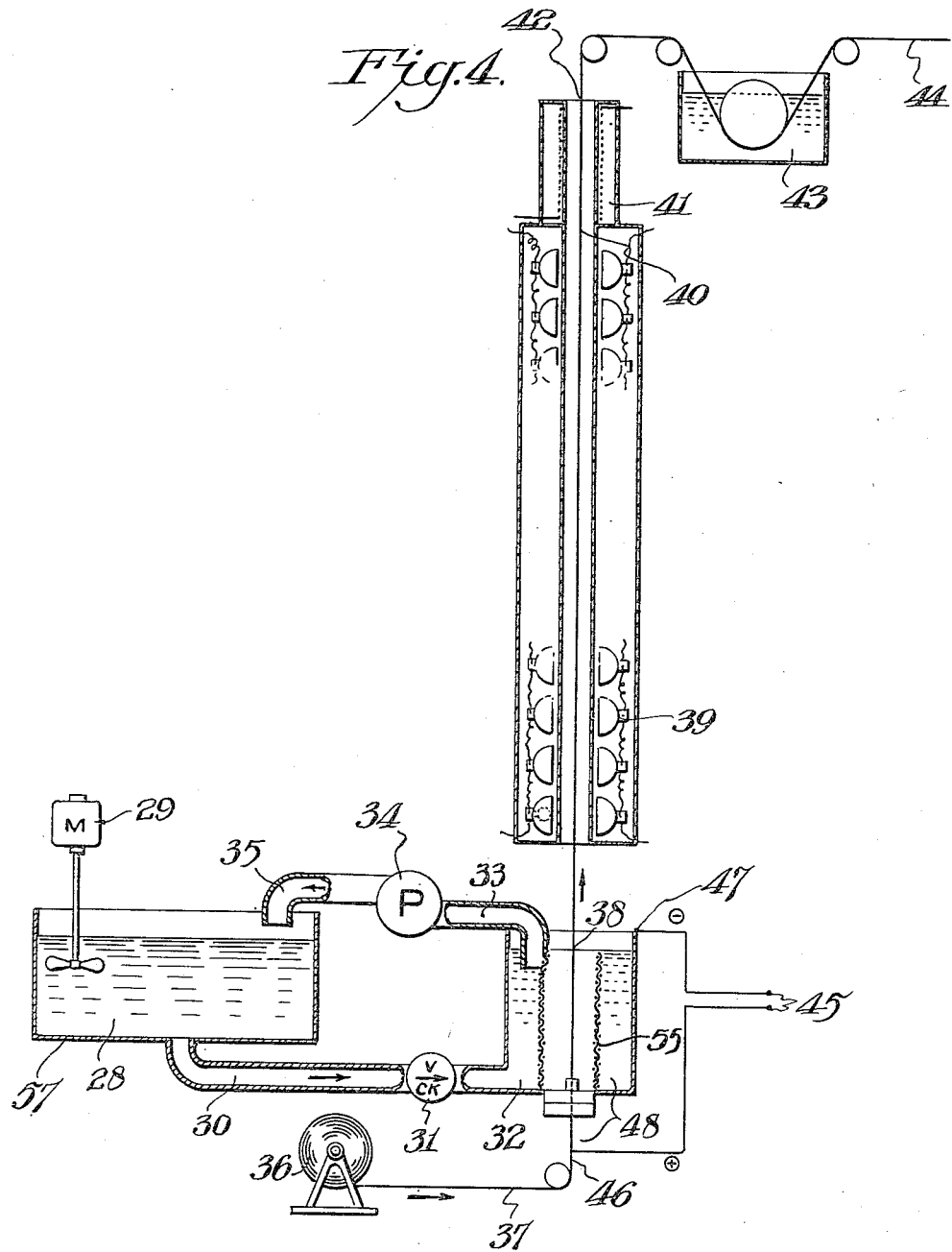

United States Patent Office 2,820,752
Patented Jan. 21, 1958

2,820,752

ELECTRODEPOSITION OF TETRAFLUORO-ETHYLENE POLYMERS

George William Heller, New York, N. Y., assignor to E. I. du Pont de Nemours and Company, Wilmington, Del., a corporation of Delaware Application February 4, 1954, Serial No. 408,171

7 Claims. (Cl. 204—181)

This invention relates to a process of preparing articles coated with tetrafluoroethylene polymers and more specifically it relates to a process of coating polytetrafluoroethylene onto substrates by a process of electrodeposition.

In the preparation of films or coatings of polymeric tetrafluoroethylene it is known that ordinary fabrication methods are sometimes not useful with this type of polymer because it, unlike the majority of thermoplastic materials, does not melt to a fluid state from which it can be solidified into a desired shape. It is known, for example, that polytetrafluoroethylene must be heated to a sintering temperature of at least 327° C. in order to soften the surfaces of the polymeric particles so that the particles may coalesce into a continuous surface. Furthermore, it is known that films or coatings prepared from polytetrafluoroethylene dispersions are subject to the development of minute cracks when the film or coating is too thick. This border line thickness is called the "critical cracking thickness" and ranges in value up to 3 mils depending upon the composition and process conditions used in preparing the film or coating. A discussion of this phenomenon may be found in an article by Lontz and Happoldt, "'Teflon' tetrafluoroethylene resin dispersions," Industrial and Engineering Chemistry, August 1952, page 1800, ("Teflon" is a trademark of E. I. du Pont de Nemours and Company, Inc., registered in the United States Patent Office).

In U. S. Patent 2,681,324, issued to Hochberg June 15, 1954, coating compositions are claimed which have an improved critical cracking thickness. Such compositions comprise codispersions of polytetrafluoroethylene and certain other polymeric materials, such as polymethacrylates, synthetic rubbers, polyvinyl acetate and the like.

It has now been found that, by means of a new process, wire or other similar substrates may be coated with a thicker crack-free coating of polytetrafluoroethylene than has been possible before this time. The coatings are formed by an electrodeposition process in which a mixture of polytetrafluoroethylene and a film-forming polymer from the group consisting of polyisobutylene, butyl rubber, polyalkyl acrylate, and polyalkyl methacrylate is deposited upon the substrate, followed by subjecting the coated article to a high temperature which removes all, or a substantial part, of the film-forming polymer and leaves a continuous coating of polytetrafluoroethylene. This process is capable of producing coatings in a wide range of thicknesses without the presence of any minute cracks in the coating.

It is an object of this invention to provide a novel process for forming a coating of polytetrafluoroethylene on a substrate. It is another object of this invention to form such coating by a process of electrodeposition. It is still another object of this process to produce coatings of polytetrafluoroethylene which are crack-free and which may be thicker than heretofore produced. A specific object of this invention is to provide a continuous process for coating electrical wiring with polytetrafluoroethylene in a desired thickness. Another specific object of this invention is to provide a method for coating the inside or outside surface of pipes or vessels with an adherent film of polytetrafluoroethylene. Still another specific object is to prepare unsupported, irregularly shaped articles of polytetrafluoroethylene by means of an electrodeposition process. Other objects may appear to those skilled in the art.

The above object are accomplished by preparing an aqueous codispersion of polytetrafluoroethylene particles and particles of a film-forming polymer such as polyisobutylene or a butadiene/acrylic copolymer, and employing this codispersion as the electrolyte in an electric cell by imposing a direct current across two electrodes immersed in the polymeric codispersion. It has been found that the dispersed polymer particles migrate towards the anode and are deposited thereon. The coated anode is then dried to remove water, and thereafter subjected to a temperature above the sintering temperature of polytetrafluoroethylene, causing the film-forming polymeric particles to decompose and thus leaving a continuous crack-free coating of polytetrafluoroethylene. In the preferred mode of operation, the polymeric codispersion is composed of about 100 parts of polytetrafluoroethylene solids, 5–25 parts of film-forming polymeric solids, 100 to 500 parts of water, and 1 parts of a polyethylene glycol p-octyl phenol ether (sold under the name of "Triton" X–100 by Rohm & Haas Co.). This codispersion is then placed in an electric cell, preferably one which is divided into two compartments by a barrier which is permeable to water but impermeable to the dispersed polymeric particles. The polymeric codispersion is placed in the anode compartment and a suitable electrolyte, which may be the codispersion in the anode compartment or may be brine or the like, placed in the cathode compartment. Alternatively the barrier may be one which will permit water and dispersed particles to pass through it but will not permit suspended gas bubbles to pass through it. In this case, the polymeric dispersion may be placed on both sides of the barrier. A direct current is then applied to the electric cell, preferably sufficient to produce a current density of 0.1 to 100 amps. per sq. ft. of anode surface. After the desired thickness of coating has been formed on the anode, it is removed, dried, and subjected to the sintering temperature for polytetrafluoroethylene (which, for the homopolymer at atmospheric pressure, is 327° C.), for a sufficient length of time to cause the film-forming polymer to decompose and burn off and to allow the polytetrafluoroethylene particles to soften and coalesce into a continuous coating.

In the attached drawings

Figure 1 is a schematic illustration of a method for coating an object with polytetrafluoroethylene by an electrodeposition process.

Figure 2 illustrates an embodiment of the electrodeposition process of this invention whereby a large flat object may be coated with polytetrafluoroethylene.

Figure 3 illustrates an embodiment of this invention whereby the inside surface of a pipe or vessel may be coated with polytetrafluoroethylene.

Figure 4 is a schematic illustration of the features of this invention combined into a process for continuously coating a moving wire with polytetrafluoroethylene.

Figure 5 is an enlarged cross-sectional view of the part of Figure 4 indicated at 48.

In Figure 1 there is illustrated a method for coating an article, 4, by the technique of electrodeposition. A container 5 serves as the electrodeposition cell. The walls of container 5 must be electrically conductive while the bottom must be non-conductive. Such a combination may be attained in many ways, one of which, as illustrated in Figure 1, is to cover the inside surface of the bottom of container 5 with an insulating material 7, such as a layer of rubber, paint, or an insulating grease. Another method is to utilize a metallic tube, one end of which is plugged with a rubber stopper. Container 5 is filled with an electrolyte bath 8, which is an aqueous co-dispersion of polytetrafluoroethylene and a film-forming polymer. The electrodeposition is accomplished by making article 4 anodic, and container 5 cathodic by known electrical connections. In Figure 1 a direct current of electricity having a source 1 is connected so that lead 2 carries positive current and lead 6 carries negative current. Lead 2 is connected to bus bar 3 which supports article 4 by means of wire 10. The circuit is completed by the flow of ions from the anode 4 to the cathode 5. In the process of electrodeposition gas bubbles may be formed by electrolysis, and these gas bubbles may migrate to the anodic article 4. In order to prevent the migration of gas bubbles, barrier 9 is employed, which is permeable to the polymeric particles in the electrolyte bath 8, but which is impermeable to gas bubbles. A suitable material for barrier 9 is a close-woven glass cloth, although many dielectric materials are suitable in place of glass.

In Figure 2 an arrangement is illustrated which is suitable for coating a large flat object 14 which is too bulky to fit into a container such as shown in Figure 1. The apparatus in Figure 2 consists of a large shallow container 11, made of a dielectric material or coated with a dielectric material on its inside surface. The article 14 which is to be coated is submerged in electrolyte 18, and is placed with a rubber sheet 16 below article 14 and metallic screen 13 above article 14. The electrical circuit is completed by traversing from the source of direct current 19 to the positive current lead wire 17 to contacts 15 to article 14, through the electrolyte 18 to screen 13, to negative current lead wire 12 to source 19. Contacts 15 are a series of needle-like projections connected to lead wire 17, piercing rubber sheet 16, and supporting article 14. Contacts 15 may be made from objects resembling thumb tacks, and placed in such a manner that the large flat head rests on the bottom of container 11 with the points piercing rubber sheet 16 and supporting article 14. By means of this circuit article 14 is anodic and screen 13 is cathodic. Any bubbles which form by electrolysis will rise and pass through the screen to the surface of electrolyte 18. Therefore there is no need for a barrier such as that shown at 9 in Figure 1. Rubber sheet 16 serves to protect lead wire 17 and contacts 15 from being coated to any great extent with polymeric particles. The electrolyte 18 is the same composition as that already described for Figure 1. It is apparent that by varying the length of contacts 15, the underneath side of article 14 may be coated or not coated depending on the amount of space between article 14 and rubber sheet 16.

In Figure 3 an arrangement is illustrated for coating the inside surface of a hollow article such as a pipe or vessel. The arrangement of Figure 3 is essentially the same as that of Figure 1 except that the electrical connections are reversed. Considering that the article to be coated 23 is a pipe, one end is closed with a stopper 24, or other suitable closure means, made of a dielectric material, and the pipe 23 is filled with electrolyte 25 which is the same as that described in Figure 1. Rod 21 is submerged throughout the length of pipe 23 and is surrounded by a barrier 26 which is impermeable to gas bubbles but permeable to liquid flow. The electrical circuit, beginning at a source of direct current 27, travels in order through positive lead wire 22, to pipe wall 23, through electrolyte 25, to rod 21, to negative lead wire 20, and back to source 27. This electrical connection makes the pipe 23 anodic and rod 21 cathodic, causing the negatively charged polymeric particles in electrolyte 25 to be attracted to pipe 23 and to form a coating thereon. If a vessel were to be coated instead of pipe 23, there would be no need for stopper 24. Furthermore, cathode 21 may be specially designed so as to give the optimum current density throughout electrolyte 25 when irregularly shaped articles are to be coated. Sintering temperatures may be maintained by the use of an electric resistance heater or other methods known to those skilled in the art.

The process of this invention is particularly well suited for continuously coating wire with a polymer of tetrafluoroethylene. Figure 4 is a schematic drawing of a process for continuously coating wire according to this invention. In reservoir 57 a polymeric dispersion or codispersion, 28, is made and stored. Dispersion 28 is mildly agitated by any suitable mechanism 29. Dispersion 28 flows continuously through line 30 and check valve 31 into electrodeposition cell 32 where the polymeric solids are deposited onto wire 38. The dispersion is then continuously pumped through line 33, pump 34, and line 35 back into reservoir 57. Newly made dispersion is continuously added to dispersion 28 to make up for that lost as a coating on wire 38. The water content of the coating on the wire at 28 is about 10% less than the water content of the dispersion in the electrodeposition cell 32. It is therefore convenient to add, as make-up for dispersion 28, a dispersion of 10% higher solids content than that in the wire coating at 38. For example, it has been found that a wire coating at 38 of about 50% solids content and 50% water content can be achieved continuously by adding make-up dispersion of about 60% solids content to the reserve dispersion, 28.

Wire which is to be coated is fed from roll 36 to 37 and around a pulley so that it is then in a position to be coated, dried and sintered without being bent until the coating is completely fused. It is convenient for these steps to be accomplished while the wire travels in a vertical direction. Wire enters the bottom of electrodeposition cell 32 through region 48, which is shown in detail in Figure 5. The wire is coated with a soft coating of about 50% solids and 50% water during its travel through electrodeposition cell 32. The coated wire at 38 then enters drying oven 39 in which sufficient heat is applied to drive off all the water from the soft coating. The temperature of the drying oven may be about 200°–300° C. The drying may be accomplished by infrared lamp, a hot gas stream, or other known methods. At 40 the dry wire coating enters sintering oven 41 in which the temperature is high enough to cause sintering and coalescence of the tetrafluoroethylene particles into a smooth crack-free coating at 42. The codispersed, film-forming polymer is decomposed in sintering oven 41 so that the coating at 42 consists completely or essentially of polytetrafluoroethylene. The temperature in the sintering oven 41 will depend on the composition of the tetrafluoroethylene polymer employed, e. g., the homopolymer is sintered at temperatures above 327° C. while a copolymer may require a different temperature. In general however, the sintering oven will be maintained at 300°–500° C. The coated wire at 42 may be air cooled and wound up at 44 or it may be quenched at 43 and then wound up at 44.

The electric circuit for the electrodeposition cell consists of a direct current source at 45, along with voltmeters, ammeters, and control devices for regulating the current and contacts 46 and 47. The positive contact is made at 46 by a sliding contact between wire 37 and the electric source. The negative contact is made at 47 by attaching the electric wire directly to the wall of the electrodeposition cell, which is constructed of copper, aluminum, or other conductive material. By this electrical connection the wire travelling from 37 to 38 is made the anode of the electrodeposition cell, and the cell wall becomes the cathode. Polymeric particles in the codispersion filling the cell become negatively charged and are therefore attracted to the anodic wire. Metallic ions from the anode are positively charged and they migrate away from the anode. These metallic anions diffuse through the surrounding polymeric codispersion and cause the codispersion to coagulate around the wire and thus cohere slightly to other particles. In this fashion a coagulated annulus of wet polymeric particles is formed which clings to the anodic wire by electrical attraction to form a soft, fragile coating at 38 as it leaves the electrodeposition cell.

Because gas bubbles are formed at the wall of the cell and migrate toward the anode, it is desirable that a barrier 55 be placed between the cathodic walls and the anodic wire. Barrier 55 is semipermeable in that water and polymeric particles may pass through the pores in the barrier while gas bubbles are too large to pass through the pores. If no barrier is employed the gas bubbles will eventually get close enough to the anode that they will be trapped in the coating and will cause voids in the coating.

In Figure 5 there is shown a detailed view of the bottom of electrodeposition cell 32, at the point where wire 38 enters the cell. The sliding contact between wire 38 and the positive direct current is shown at 46.

Blocks 49 and 50 act as retainers for diaphragm 51. Diaphragm 51 is a soft rubber sheet, pierced in the center so that wire 38 may pass through, and serves as a seal to prevent the liquid dispersion contained in cell 32 from leaking out around wire 38. Blocks 49 and 50 may be connected by a hinge and held closed by a clamping device 52 so that in a closed position sufficient pressure is applied to diaphragm 51 to hold it in place and seal against leakage. Blocks 49 and 50 must be constructed of some insulating material, such as hard rubber, and they may be attached to the bottom of cell 32 in any convenient fashion, e. g., by adhesive materials.

The entrance of wire 38 into cell 32 is shielded by a short length of glass tubing or other similar insulating tubing. If some shield such as the tubing 53 is not used, electrodeposition of polymeric particles takes place at 54 because of the proximity of the cathodic walls of cell 32 to the anodic wire 38 and causes a build-up of polymer in an uneven fashion. There is also a tendency to plug up the opening at 54 if shield 53 or its equivalent is not used. As an additional aid in preventing this premature, uneven deposit of polymer, the lower part of the walls and the bottom of cell 32 are coated on the inside at 56 with an insulator such as a silicone grease. The walls are coated only to about an inch or two above the bottom of cell 32. This insulating coating 56 also prevents the formation of gas bubbles which might migrate through the bottom of barrier 55 or form on the bottom of cell 32 between barrier 55 and wire 38.

In order to accomplish a production rate of about 50 feet of wire per minute, it has been found that a 32 mil wire may be coated with a 5 mil film of sintered polytetrafluoroethylene by the process described above. The cell, for such a continuous process, preferably is a cylindrical aluminum tube about 3 inches in diameter and 12 inches long. The depth of the liquid codispersion in the cell is about 10 inches. Using a current of about 0.4 ampere and 50 volts, the desired thickness of coating is accomplished in about one second.

The following examples are presented to illustrate many of the features of this invention without any intent that this invention be limited thereby.

*Examples 1 to 5.*—An electrodeposition cell was made by placing the electrolyte in a laboratory beaker and immersing in the electrolyte three sheet metal electrodes, one of which was placed in the center of the beaker and the other two spaced on either side of the center electrode, about 1 inch away from it. In some tests a 250 cc. beaker was used as the cell and 100 cc. of polymeric dispersion used as the electrolyte. In another series of tests a 400 cc. beaker was utilized in conjunction with about 300 cc. of electrolyte. A direct current was imposed across the three electrodes in such a fashion that the center electrode was the anode and the two outside electrodes were cathodes. The current was supplied by connecting a source of 110 volt alternating current through a variable resistance to a selenium oxide rectifier. The direct current output of this rectifier could be controlled from 0 to 100 volts and from 0 to 0.5 ampere.

In this example the effect of current density was measured by electrodepositing tetrafluoroethylene resin on to the surfaces of a copper anode. The electrolyte was an aqueous dispersion of polytetrafluoroethylene containing about 35% solids. This dispersion may be made by the processes described in U. S. Patent 2,478,229, issued to Berry on August 9, 1949, or U. S. Patent 2,559,752, issued to Berry on July 10, 1951. The results of the experiment are shown in Table I.

*Table I*

| Example | Potential, volts | Current, amperes | Time, seconds | Concentration of polymeric dispersion, percent solids | Electricity, coulombs | Current density, milliamps. per sq. cm. | Current yield, gms. dry polymeric deposit per Faraday | Water content of the deposit, percent |
|---|---|---|---|---|---|---|---|---|
| 1 | 6 | 0.065 | 120 | 35 | 7.8 | [1] 2.5 | 50,000 | 21.5 |
| 2 | 10 | 0.13 | 60 | 35 | 7.8 | [1] 5.0 | 46,000 | 21.1 |
| 3 | 20 | 0.26 | 30 | 35 | 7.8 | [1] 10.1 | 46,000 | 20.3 |
| 4 | 30 | 0.39 | 20 | 35 | 7.8 | [1] 15.1 | 45,700 | 19.2 |
| 5 | [3] 35-100 | 0.26 | 20 | 35 | [3] 5.2 | [2] 20.2 | 43,600 | 17.0 |

[1] 2 inches x 1 inch copper anode used.
[2] 1 inch x 1 inch copper anode used.
[3] Increased potential as the resistance of the coating increased.

*Examples 6 to 11.*—In this series of tests the same equipment was utilized as was described in Examples 1 to 5. This series of examples was designed to show the effect of varying the solids content of the polymeric dispersion used in the electrolyte. The electrolyte was the same polymeric dispersion of tetrafluoroethylene as that utilized in Examples 1 to 5 and was appropriately diluted with distilled water to produce the solids content used in this series of examples. A copper anode measuring 1 inch by 2 inches was utilized in each of these examples. The results of these tests are shown in Table II.

*Table II*

| Example | Potential, volts | Current, amperes | Time, seconds | Concentration of polymeric dispersion, percent solids | Electricity, coulombs | Current density, milliamps. per sq. cm. | Current yield, gms. dry polymeric deposit per Faraday | Water content of the deposit, percent |
|---|---|---|---|---|---|---|---|---|
| 6 | 20 | 0.27 | 30 | 35 | 8.1 | 10.5 | 46,000 | 20.3 |
| 7 | 23 | 0.27 | 30 | 30 | 8.1 | 10.5 | 36,400 | 20.4 |
| 8 | 27 | 0.27 | 30 | 25 | 8.1 | 10.5 | 26,200 | 20.6 |
| 9 | 45 | 0.27 | 30 | 15 | 8.1 | 10.5 | 18,600 | 20.4 |
| 10 | 60 | 0.27 | 30 | 10 | 8.1 | 10.5 | 13,700 | 21.2 |
| 11 | 100 | 0.24 | 30 | 5 | 7.2 | 9.3 | 8,350 | 23.1 |

*Examples 12 to 21.*—This series of examples was designed to show the effect of including dispersing agents in the electrolyte for the purpose of maintaining a more stable dispersion. The equipment which was used was the same as that described for Examples 1 to 5 utilizing a copper anode measuring 1 inch by 2 inches and employing a polytetrafluoroethylene dispersion of 35% solids content as the electrolyte. The results of these tests are shown in Table III.

Table III

| Example | "Triton" X-100 [a] dispersing agent added percent based on polymer | Current yield, gms. of dry polymer deposited per Faraday | Example | "Duponol" ME [b] dispersing agent added percent based on polymer | Current yield, gms. of dry polymer deposited per Faraday |
|---|---|---|---|---|---|
| 12 | 0 | 39,000 | 17 | 0 | 39,000 |
| 13 | 1 | 30,800 | 18 | 1 | 17,400 |
| 14 | 3 | 20,900 | 19 | 3 | 9,530 |
| 15 | 6 | 16,900 | 20 | 6 | 6,140 |
| 16 | 10 | 13,700 | 21 | 10 | 3,310 |

[a] "Triton" X-100, non-ionic dispersing agent, octylphenolethylene oxide condensation product, manufactured by Rohm and Haas Company.
[b] "Duponol" ME, anionic dispersing agent, sodium lauryl sulfate, manufactured by E. I. du Pont de Nemours & Co.

*Examples 22 to 38.*—In this series of examples copper wire was coated with polytetrafluoroethylene by the electrodeposition process of this invention. The laboratory apparatus consisted of a 6-inch length of 2-inch diameter copper tube supported vertically and closed at the bottom with a one-hole rubber stopper. A thin film of soft rubber was held tightly in place over the exposed portion of the rubber stopper and the lower end of the copper tube. A minute hole was pierced in the thin rubber film so that the copper wire which was to be coated could be passed through the hole without allowing the liquid electrolyte to leak out around the wire. The copper tube served as the cathode and the copper wire served as the anode in this electric cell. The wire was pulled upward through the electric cell during the electrodeposition process at such a speed that a continuous uniform coating of polymeric material was formed on the wire. In this fashion, wires approximately 12 inches in length were coated with the polymeric material and were then placed in a circulating air-drying oven at temperatures from 100° C. to about 230° C., followed by placing the dried coated wire in a sintering oven at temperatures from about 330° C. to about 380° C., and thus producing a finished product. In this series of examples the electrolyte was an aqueous co-dispersion prepared by starting with an aqueous dispersion of polytetrafluoroethylene (as described in Examples 1–5) containing 30% to 51% solids (as shown in the accompanying table), and adding to that dispersion 1% of "Triton" X-100 based on the weight of polytetrafluoroethylene solids, and sufficient "Loxite" 8502 (a 50% aqueous dispersion of polyisobutylene manufactured by Xylos Rubber Co.) to incorporate 10% of polyisobutylene solids based on the weight of polytetrafluoroethylene. This codispersion was prepared by physical mixing of the three ingredients. The results of these tests are shown in Table IV. The copper wire which was coated was 64 mils in diameter, except as otherwise indicated.

*Example 39.*—Using the technique described in the previous two series of examples, several coated wires were subjected to tests to show the electrical properties of the coated wire. The test utilized is that described in A. S. T. M. Specifications D 149–44, "Test for Dielectric Strength of Insulating Materials at Commercial Power Frequencies," and particularly described therein as the "short-time" test. Table V shows the electrical voltage breakdown values of wire samples coated with various thicknesses of polytetrafluoroethylene. The wire used in this example was a 64 mil diameter copper wire.

*Example 40.*—This example demonstrates the application of adherent coatings of tetrafluoroethylene to rods 6 inches in length and ½ inch in diameter. The electrodeposition bath was a mixture of 1 part of "Polyco–423N" dispersion (trade name of an aqueous dispersion of a butadiene-acrylic resin of about 40% solids made by American Polymer Corporation) and 4 parts of an aqueous dispersion of tetrafluoroethylene resin containing about 35% solids. Figure 1 illustrates the embodiment of this electrodeposition process.

Table IV

30% POLYTETRAFLUOROETHYLENE SOLIDS

| Example | Current (amps.) | Electrodeposition time (sec.) | Weight percent of water in coating | Thickness of coating (mil) | Current yield, gms. dry polytetrafluoroethylene per Faraday |
|---|---|---|---|---|---|
| 22 | 0.2 | 3 | 66.3 | 6.5 | 25,000 |

35% POLYTETRAFLUOROETHYLENE SOLIDS

| 23 | 0.2 | 3 | 45.6 | 6.0 | 44,200 |
| 24 | 0.2 | 3 | 52.8 | 7.0 | 34,600 |

37% POLYTETRAFLUOROETHYLENE SOLIDS

| 25 | 0.2 | 2 | 48.4 | 5.0 | 36,200 |
| 26 | 0.2 | 2 | 41.4 | 4.0 | 42,300 |
| 27 | 0.2 | 3 | 48.5 | 10.5 | 27,400 |
| 28 | 0.2 | 4 | 50.0 | 8.0 | 27,200 |
| 29 | 0.4 | 2 | 53.7 | 10.0 | 30,200 |

42% POLYTETRAFLUOROETHYLENE SOLIDS

| 30 | 0.2 | 3 | 60.3 | 8.5 | 28,100 |
| 31 | 0.2 | 3 | 48.9 | 9.0 | 37,800 |
| 32 | 0.2 | 3 | 44.8 | 8.5 | 42,600 |

51% POLYTETRAFLUOROETHYLENE SOLIDS

| 33 | 0.07 | 5 | 44.5 | 5.5 | 47,000 |
| 34 | 0.07 | 10 | 44.8 | 10.5 | 44,300 |
| 35 | 0.09 | 5 | 41.7 | 7.0 | 45,000 |
| 36 | 0.2 | 2 | 41.0 | 5.5 | 39,900 |
| 37 | 0.2 | 4 | 40.1 | 9.0 | 33,200 |
| 38 | 0.4 | 2 | 40.6 | 9.0 | 44,600 |

Table V

| Wire No. | Coating Thickness avg., mils | Electrical voltage breakdown | |
|---|---|---|---|
| | | Total kilovolt potential | Volts per mil of coating thickness |
| 1 | 6.6 | 12 | 2,000 |
| 2 | 8.5 | 16 | 1,777 |
| 3 | 9.3 | 11 | 1,048 |
| 4 | 8.0 | 10 | 1,427 |
| 5 | 11.1 | 11 | 1,047 |

In this example a copper tube 2 inches in diameter was employed as the cathode and bath and was closed at the bottom with a rubber stopper. The anode was the steel bar to be coated. A cylindrical glass cloth bubble barrier was placed between the anode (the steel bar) and the cathode (the copper tube) to prevent the gas bubbles forming at the cathode from migrating toward the anode and thereby forming voids in the coating. A current of 1 ampere direct current was connected to this system. Bars were coated for 10 to 20 seconds. The coatings were then dried in a circulating air oven for 2 hours at 80–90° C. and then sintered for 2 hours at 380° C. The bars were removed from the oven and allowed to cool. The coatings produced showed good adhesion and contained no blisters, voids, or cracks. The coatings were 5 to 7 mils thick.

*Example 41.*—This example demonstrates the coating of the inside of a pipe or vessel with polytetrafluoroethylene employing the same electrodeposition bath as employed in Example 40. Figure 3 illustrates the embodiment of this electrodeposition process. In this example a 2 inch diameter iron pipe was coated on its interior surface with tetrafluoroethylene resin. The inside surface of the iron pipe was cleaned with hydrochloric acid, and then rinsed with water and dried. The iron was filled with the electrodeposition bath described above, and a copper wire was placed in the center of the pipe along its axis, in the manner illustrated in Figure 3 of the attached drawings. The pipe was made anode in respect to the copper wire which was the cathode. A current of 3 amperes was passed through the dispersion for 90 seconds. A coating of the mixed dispersion was formed on the interior surface of the pipe. This coating was dried while suspended in a circulating air oven at 90° C. for 2 hours. The coating was then sintered at 390° C. for 15 minutes and quenched in water on removal from the oven. The inside of the pipe was covered with a glossy dark brown coating having a uniform thickness of about 7 mils, which was free from cracks, and which was tough and strongly adhered to the pipe.

*Example 42.*—This example demonstrates the employment of the same electrodeposition bath described in Example 40 in the preparation of coatings on flat metal surfaces. Figure 2 illustrates the embodiment of this electrodeposition process. In this example degreased steel plates 4 inches by 6 inches were coated in a small rubber photographic tray which contained the electrodeposition bath. A ⅛ inch mesh stainless steel screen was placed about ⅜ inch above the steel plate, which lay on the bottom of the tray. The steel plate was made anodic and the screen cathodic by suitable electrical connections. A bubble barrier was not necessary since the bubbles rose to the surface of the bath. A direct current of 3 amperes was connected to these two terminals, and by varying the coating time from 10 to 45 seconds the coating thickness was varied from 5 to 11 mils. The deposited coatings were dried in a circulating air oven at 80° C. to 90° C. for two hours. The coated plates were then suspended in the sintering oven and subjected to a temperature of 380° C. for 30 minutes. The coatings were glossy and dark brown in color; were tough, adherent, and crack-free; and had a uniform thickness of about 7 mils.

*Example 43.*—In this example several experiments are reported in which irregularly shaped molds were coated with tetrafluoroethylene resin by means of an electrodeposition process, followed by removal of the mold to leave an unsupported article of tetrafluoroethylene resin. The molds employed were in the form of small funnels, test tubes, beakers, crucibles, and diaphragms. The electrodeposition bath was essentially the same mixture as that described in Example 40. The molds were made of various materials such as "Woods" metal (an alloy of 50% Bi, 25% Pb, 12.5% Sn and 12.5% Cd), wax, and mixtures of polyethylene and wax. In the case of the molds made of wax or polyethylene-wax mixtures, the molds were coated with a conductive paint such as colloidal silver, aluminum, graphite, powdered copper, etc. The procedure for preparing the unsupported articles was to employ the mold as the anode in an apparatus similar to that shown in Figures 1 or 2 in the attached drawings, deposit a coating on the mold, dry it, and sinter it as described in the foregoing examples. At the sintering temperature of about 350° C., the mold, whether it consisted of "Woods" metal, wax, or resin-wax mixture, melted and left the unsupported article of sintered tetrafluoroethylene resin. In some cases, tiny particles of the mold metal were left clinging to the molded resinous article after the sintering operation, and these particles were removed by solvent treatment. It was found that the molds could be either solid or thin shells, although the latter were preferred since the melting and removal of the mold material was simplified.

The electrolyte used in the process of this invention may contain a homopolymer, an interpolymer, or a copolymer of tetrafluoroethylene. Whether the electrolyte contains tetrafluoroethylene resin as the sole polymeric ingredient or whether there may be other polymeric constituents in the electrolyte, it is convenient to start with an aqueous dispersion containing 30% to 50% by weight of tetrafluoroethylene resin. Such dispersions of tetrafluoroethylene resin may be made by the processes claimed and described in U. S. Patent 2,478,229, issued to Berry on August 9, 1949, and U. S. Patent 2,559,752, issued to Berry on July 10, 1951.

Although coatings of polytetrafluoroethylene may be made by the process of this invention by utilizing an aqueous dispersion containing polytetrafluoroethylene as the sole polymeric ingredient, it has been found to be desirable to employ a codispersion of polytetrafluoroethylene with another polymeric substance. The coatings made from a codispersion are preferable because thicker coatings may be made without the possibility of developing minute cracks or pinholes in the coating.

The codispersion which is utilized as the electrolyte in the process of this invention is therefore made up of three components: (1) the continuous phase, which is water, (2) dispersed particles of polytetrafluoroethylene, and (3) dispersed particles of a film-forming polymeric substance. There may or may not be present minor amounts of a dispersing agent to help maintain the dispersed condition of the polymeric particles.

The film-forming polymeric substance has the function of aiding in the formation of a smooth continuous film on the substrate, and in particular, the film-forming polymeric substance aids in the formation of a thicker film on the substrate than could be obtained by the use of a dispersion containing polytetrafluoroethylene as the sole polymeric ingredient. The substances which have been found to be operable as the film-forming component include polyisobutylene, butyl rubber, polyacrylates, polyalkylacrylates, butadiene/acrylic copolymers, butadiene/styrene copolymer, plasticized polystyrene, polyvinyl halides, polyvinylidine halides, and alkyl acrylate copolymers. Polyacrylates and polyalkylacrylates are meant to include polymethylacrylate, polymethyl methacrylate, polyethylacrylate, polyethyl methacrylate and similar polymers. Butadiene/acrylic copolymers include butadiene/acrylate, butadiene/acrylonitrile, butadiene/acrylamide. The alkyl acrylate copolymers include copolymers of 90% methyl methacrylate/10% methylacrylate, 90% methyl methacrylate/10% ethylacrylate, and similar copolymers. The polyvinyl halides and polyvinylidene halides include polyvinyl chloride, polyvinyl fluoride, polyvinylidene chloride, and polyvinylidene fluoride. Butyl rubber is meant to include the elastomeric copolymers of isobutylene and diolefins such as butadiene.

For various embodiments of this invention there are preferred substances to be chosen as the film-forming polymer. For example, if a wire is to be coated for eventual use as a conductor of electricity, the best film-forming substance is polyisobutylene because in the sintering step the polyisobutylene particles are so completely decomposed that the remaining insulation-coating is substantially pure polytetrafluoroethylene having excellent dielectric qualities. If, on the other hand, dielectric strength is not a primary requisite of the coating in its final use, such as for example where the coating is a pipe lining or where the coating is used to form an unsupported shape, the preferred film-forming polymeric substance is a butadiene/acrylic copolymer. In the latter case, wherein a butadiene/acrylic copolymer is utilized the coating is extremely adherent to iron and steel substrates; while in the former case, wherein polyisobutylene is utilized, the coating can be stripped from the substrate with relative ease.

The amount of the film-forming polymeric substance, such as polyisobutylene or butadiene/acrylic copolymer, may vary with different embodiments of this invention. However, it has been found that in most cases from 5% to 25% by weight of the film-forming polymeric component, based on the weight of the polymeric tetrafluoroethylene, imparts film-forming properties which, in turn, permit the preparation of the high quality coatings described herein. The preferred amount of film-forming component is from about 10% to about 20% by weight of the polytetrafluoroethylene present.

The particle size of the film-forming component is of importance in the preparation of homogeneous coatings. As described elsewhere herein, the final step in the preparation of a coating by this process is to subject the coating to a sintering temperature which is high enough to cause the film-forming polymer to decompose completely and, at the same time, to soften the tetrafluoroethylene polymer particles, causing them to coalesce into a smooth homogeneous coating. If the particles of the film-forming polymer are too large as compared to the coating thickness, the decomposition of a large particle may leave a void which cannot be filled by the softened particles of tetrafluoroethylene particles. In general, particles of the film-forming polymer which are larger than about 2 mils in diameter are not desirable in this process, and if coatings less than about 5 mils thick are prepared the particle size should be even smaller.

Mild agitation is normally sufficient to maintain the electrolyte in its dispersed condition. For long periods of static storage, it may be desirable to add minor amounts of compounds which inhibit the separation of the dispersed phase from the continuous phase.

Tetrafluoroethylene resin particles have a tendency to coagulate by adhering to each other. To prevent coagulation it is sometimes desirable that small amounts of a non-ionic surface-active dispersing agent be added to the electrolyte, although the incorporation of this additive is not necessary in every embodiment of this invention. The preferred dispersing agent is "Triton" X–100, a polyethylene glycol mono-p-octylphenyl ether made by Rohm and Haas Company, although there are many other non-ionic surface-active dispersing agents which may be used in the process of this invention. The amount of dispersing agent which may be employed is preferably not more than about 2% by weight of the tetrafluoroethylene polymer in the dispersion. The use of larger amounts of dispersing agent results in a less efficient process because the current yield of the electrodeposition process decreases as the concentration of dispersing agent increases. There is also a tendency for the development of cracks in the coatings prepared from dispersions containing more than about 2% dispersing agent.

The electrolyte as ready for use in the process of this invention is an aqueous codispersion of polytetrafluoroethylene and a film-forming polymeric substance. The electrolyte may contain from about 20% to about 60% total solids, and preferably from about 30% to about 40% total solids. The remainder being water which may or may not contain a dispersing agent. The electrolyte is conveniently prepared by mixing an aqueous dispersion of polytetrafluoroethylene with an aqueous dispersion of the film-forming polymeric substance, adding dispersing agent to the codispersion mixture if desired.

In order to insure uniformity in the thickness of coating deposited on articles by this process, it is desirable that the surface of the article be thoroughly cleaned to remove any non-conducting substances such as grease, mill scale, lacquer, etc. Iron and steel articles may be cleaned by degreasing operations or acid pickling processes, other metals may be cleaned by other well known procedures.

The article which is to be coated must be a conductor of electricity in order to function as the anode of the electrolytic cell. It is believed that metallic ions released from the anode cause coagulation of the dispersed particles surrounding the anode thus causing the particles to cling to each other in addition to being attracted to the anode because of the opposite electrical charges on the anode and on the particles. Practically any metal is operable in the process of this invention, although some metals are more desirable than others. Iron, steel, copper, zinc, lead, silver, brass, tin, nickel, Wood's metal, and chromium have all been found operable under varying conditions of operation. Aluminum is operable, although it may not be desirable for some embodiments of this invention, because aluminum, when made anodic, releases oxygen from the surrounding electrolyte and the deposited coating sometimes traps the released oxygen, forming voids in the coating.

The current yields of the present process may vary from 5000 to 25,000 grams of deposit per Faraday of electricity. Such a high current yield requires only a small amperage compared to processes for electrodepositing metals, and therefore, there may be a wide variety of current yields with different electrolyte compositions, all of which are commercially attractive because of the low power cost involved. Current densities at the anode may vary from about 0.1 to about 100 amperes per square foot of anode surface, for commercially feasible processes. Using a current of 5 amperes and an anode of 20 to 30 square inches in area, coatings 10–20 mils in thickness may be prepared in 10–60 seconds of electrodeposition time.

The freshly deposited polymeric coating on wire or other substrate is somewhat soft and fragile. By subjecting the freshly deposited coating to a drying step the fragility is largely overcome. Such a drying step may be accomplished by the application of heat in the form of hot air or infra red radiation or other methods known to those skilled in the art. It has been found that a drying temperature of about 230° is very satisfactory in that the process time for drying is greatly reduced, although it is not intended that this invention be limited to any single drying temperature.

The drying step is followed by a sintering step in which the film-forming polymer is decomposed and the remaining polytetrafluoroethylene is coalesced to form a uniform smooth continuous coating which is entirely free from minute cracks and pinholes. The sintering temperature is the temperature at which the tetrafluoroethylene polymer begins to coalesce. For the homopolymer of tetrafluoroethylene the sintering temperature at atmospheric pressure is 327° C., although it is desirable to employ higher temperatures, such as 350° C. to 400° C., in order to obtain high quality coatings in a short period of time. The sintering temperature of copolymers or other mixtures may vary somewhat from the above temperatures, although temperatures from about about 300° C. to 500° C. will generally be sufficient to coalesce the coating. If the sintering is accomplished under superatmospheric pressure the sintering temperature is higher. When polyisobutylene is utilized as the film-forming component of the codispersion, a coating is formed which, after the sintering step, contains only polytetrafluoroethylene. When film-forming substances, such as butadiene/acrylic copolymers, are utilized, the sintered coating contains some carbonaceous residue derived from the decomposition of the film-forming substance. Such coatings as the latter have excellent adherence to the substrate, but are not excellent electrical insulators. Other film-forming compounds described above as operable in this invention can be employed to obtain coatings having varying degrees of insulation qualities or adherence qualities.

Where it is desired to make unsupported shapes of tetrafluoroethylene resin a mold may be made from a material which will melt below the sintering temperature of tetrafluoroethylene resin (about 327° C.) and above the drying temperature employed. Various low melting alloys may be employed, such as the soldering metals, "Woods" metal, and other known alloys. Other materials which may be employed to form the mold include waxes, resins, etc. If the mold material is not electrically conductive paints or coatings may be applied to cause the mold to be conductive. The mold may then be made the anode the electrodeposition systems described herein, and a coating of tetrafluoroethylene resin formed on the outside of the mold. The mold is then melted away during the sintering of the tetrafluoroethylene resin.

Pigments or fillers of any kind may be incorporated into the codispersion described above to color or modify the coating. Furthermore, the codispersions utilized in the process of this invention, modified by the addition of pigments, can be applied to polytetrafluoroethylene surfaces in the manner of paint or printing ink, followed by a second sintering step, as described above, to produce a marked article, a coated wire with identifying color stripes, or printing, or the like.

In certain embodiments of this invention the herein described process may be used to prepare coated wire having excellent electrical insulation properties because of the low conductivity combined with the high abrasion resistance of polymers of tetrafluoroethylene. Wire coated with polytetrafluoroethylene finds use as lead wire, instrument wire, motor and transformer wire, telephone wire, thermocouple wire, and any other use where high quality insulated wire is required. Belting may be made by forming a coating on a ribbon-like substrate. Resistors may be made from substrates coated by the processes of this invention. Tubing may be coated and utilized for induction heating coils. Substrates may be coated followed by stripping the coating from the substrate to obtain a film.

In other embodiments of this invention the described process may be employed to line piping, valves, process equipment and the like where a smooth corrosion resistant coating is desirable. Plates, bars, rods, tubes and other structural shapes may also be coated with polytetrafluoroethylene by the process of this invention. Unsupported articles of tetrafluoroethylene resin may be made for employment at high temperatures or under corrosive conditions. Many other specific applications of this process will be apparent to those skilled in the art of electrodeposition.

I claim:

1. A process for continuously coating wire with substantially pure polytetrafluoroethylene in the form of a homogeneous smooth crack-free coating of electrical insulation, which comprises maintaining an aqueous codispersion containing 20% to 60% by weight of solids comprising polytetrafluoroethylene and polyisobutylene, the ratio of polytetrafluoroethylene solids to polyisobutylene solids being from about 20:1 to about 4:1, continuously passing a wire through said codispersion which is simultaneously subjected to a direct current of electricity in such a fashion that said wire is anodic, continuously removing a wire coated with a wet mixture of polytetrafluoroethylene and polyisobutylene, continuously drying the coated wire, and continuously passing the dried coated wire through a zone, maintained at a temperature from about 300° C. to 500° C., for a time sufficient to allow the polyisobutylene to be decomposed completely and to allow the remaining polytetrachloroethylene to coalesce into a smooth crack-free coating.

2. The process of claim 1 in which the aqueous codispersion of polytetrafluoroethylene and polyisobutylene contains a minor amount, but not more than about 2% by weight, of a non-ionic, surface-active dispersing agent.

3. The process of claim 2 in which said dispersing agent is an alkylphenyl ether of a polyethylene glycol and the amount of said dispersing agent incorporated in the codispersion is not more than about 2% by weight of the polytetrafluoroethylene present.

4. The process of claim 1 in which the ratio of polytetrafluoroethylene solids to polyisobutylene solids in the codispersion is from about 5:1 to about 10:1.

5. The process of claim 1 in which the smooth crack-free coating has a thickness of 5 to 10 mils.

6. A process for coating an article with a crack-free film of substantially pure polytetrafluoroethylene comprising the steps of forming an aqueous codispersion containing 20% to 60% by weight of solids comprising polytetrafluoroethylene and polyisobutylene, said polyisobutylene being present in the amount of 5% to 25% by weight of said polytetrafluoroethylene, conducting a direct current of electricity through a closed circuit, comprising a source of electricity, an anode, said aqueous codispersion, and a cathode, until said anode is coated with a desired thickness of a mixture of polytetrafluoroethylene and polyisobutylene from said dispersion, drying the coating on said anode, thereafter subjecting the coated anode to a temperature of 300° C. to 500° C. for sufficient time to decompose said polyisobutylene and to sinter said polytetrafluoroethylene, and recovering said anode coated with a smooth crack-free film of substantially pure polytetrafluoroethylene, free of carbonaceous deposits.

7. The process of claim 6 in which said anode coated with a smooth crack-free film of substantially pure polytetrafluoroethylene is subsequently separated from said crack-free film to produce an unsupported smooth crack-free film of substantially pure polytetrafluoroethylene, free of carbonaceous deposits.

References Cited in the file of this patent

UNITED STATES PATENTS

| | | |
|---|---|---|
| 2,478,322 | Robinson et al. | Aug. 9, 1949 |
| 2,681,324 | Hochberg | June 15, 1954 |